United States Patent
Papadimitriou

(10) Patent No.: US 7,830,803 B2
(45) Date of Patent: Nov. 9, 2010

(54) NETWORK FOR SETTING UP CONNECTIONS BETWEEN NODES

(75) Inventor: Dimitri Papadimitriou, Brussels (BE)

(73) Assignee: Alcatel, Paris (FR)

( * ) Notice: Subject to any disclaimer, the term of this patent is extended or adjusted under 35 U.S.C. 154(b) by 841 days.

(21) Appl. No.: 11/166,212

(22) Filed: Jun. 27, 2005

(65) Prior Publication Data

US 2006/0002300 A1    Jan. 5, 2006

(30) Foreign Application Priority Data

Jul. 2, 2004  (EP) .................................. 04291695

(51) Int. Cl.
*G01R 31/08* (2006.01)
*H04L 12/28* (2006.01)

(52) U.S. Cl. ...................... 370/236; 370/254; 370/389; 370/392; 370/400

(58) Field of Classification Search .................. 398/48, 398/56–58, 75; 370/236, 238, 352–356, 370/468
See application file for complete search history.

(56) References Cited

U.S. PATENT DOCUMENTS

| 7,340,169 B2 * | 3/2008 | Ovadia et al. ................. 398/57 |
| 7,352,758 B2 * | 4/2008 | Makam et al. ............... 370/405 |
| 7,561,549 B2 * | 7/2009 | Meier et al. ................. 370/331 |
| 2002/0141444 A1 | 10/2002 | Kano et al. |
| 2002/0191250 A1 * | 12/2002 | Graves et al. ................. 359/128 |
| 2003/0026210 A1 | 2/2003 | Suemura et al. |
| 2003/0048778 A1 * | 3/2003 | Davison ...................... 370/389 |
| 2004/0001714 A1 * | 1/2004 | Ozugur et al. ................. 398/57 |
| 2004/0157602 A1 * | 8/2004 | Khawand ..................... 455/434 |
| 2004/0246912 A1 * | 12/2004 | Hoang et al. ................. 370/254 |
| 2004/0264465 A1 * | 12/2004 | Dunk .......................... 370/392 |
| 2005/0076339 A1 * | 4/2005 | Merril et al. ................. 718/104 |

* cited by examiner

*Primary Examiner*—Jason E Mattis
*Assistant Examiner*—Brandon Renner
(74) *Attorney, Agent, or Firm*—Sughrue Mion, PLLC

(57) ABSTRACT

Networks (8) for setting up connections between nodes (1,2) via request messages (R1) and allocation messages (A1) are made more efficient by providing the request messages (R1) with indications for indicating the first node's capabilities with respect to different signalling procedures and by providing the allocation messages (A1) with instructions for instructing the first nodes (1) to use one of the signalling procedures. Only one round trip is needed. The indications comprise first preference values for the first signalling procedure (wavelength switching) and second preference values for the second signalling procedure (waveband switching). The instructions comprise signalling information and signalling procedure assignments. The second nodes (2) run label assignment algorithms for making the signalling procedure assignment in dependence of the preference values. The first nodes (1) derive further signalling information from the signalling information, which signalling information is related to the first signalling procedure and which further signalling information is related to the second signalling procedure.

8 Claims, 3 Drawing Sheets

NETWORK FOR SETTING UP CONNECTIONS BETWEEN NODES

The invention relates to a network for setting up a connection from a first node to a second node through transmitting a request message from the first node to the second node and transmitting an allocation message from the second node to the first node.

Examples of such networks are optical fibre networks, the nodes for example being optical switches.

BACKGROUND OF THE INVENTION

A prior art network is of common general knowledge. A first node transmits a request message to a second node and receives in return an allocation message from the second node. These messages are related to one and the same signalling procedure.

The known network is disadvantageous, inter alia, due to its nodes sometimes being capable to handle different signalling procedures. In that case, for each one of the signalling procedures, a request message and an allocation message need to be exchanged. This is relatively inefficient (two separate round trips).

SUMMARY OF THE INVENTION

It is an object of the invention, inter alia, to provide a network as defined above, which is relatively efficient.

The network according to the invention is characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection.

By providing the request message with the indication and by providing the allocation message with the instruction, only one round trip is needed. This network according to the invention is therefore more efficient.

An embodiment of the network according to the invention is characterised in that the first node comprises a first controller for supplying the indication comprising a first preference value for the first signalling procedure and a second preference value for the second signalling procedure, the second node comprising a second controller for supplying the instruction comprising signalling information and a signalling procedure assignment.

The first (second) preference value for example comprises a bit having the value zero in case the first node cannot handle or does not want to handle the first (second) signalling procedure and having the value one in case the first node can handle or does want to handle the first (second) signalling procedure. In case both preference values have the value one, the second node will have an option of selecting one of the signalling procedures.

An embodiment of the network according to the invention is characterised in that the second controller is arranged to run a label assignment algorithm for making the signalling procedure assignment in dependence of the preference values, the first controller being arranged to derive further signalling information from the signalling information, which signalling information is related to the first signalling procedure and which further signalling information is related to the second signalling procedure.

The label assignment algorithm generates the signalling procedure assignment for assigning one of the signalling procedures to the first node. The signalling information can be related to the first signalling procedure, as long as the first node is capable of deriving the further signalling information from this signalling information. Then, the second node does not need to adapt this signalling information, but can send the signalling information to the first node independently from the kind of signalling procedure to be used. This network according to the invention is very efficient.

An embodiment of the network according to the invention is characterised in that the first signalling procedure is wavelength switching, the second signalling procedure being waveband switching.

The signalling information then comprises the wavelength to be used. In case of the waveband needing to be switched (possibly preferably), this waveband can be derived from the wavelength information.

An embodiment of the network according to the invention is characterised in that the first signalling procedure is waveband switching, the second signalling procedure being fibre switching.

The signalling information then comprises the waveband to be used. In case of the fibre needing to be switched (possibly preferably), the fibre to be used can be derived from the waveband information.

An embodiment of the network according to the invention is characterised in that the first node is an upstream node, the second node being a downstream node.

The connection is then set up in a downstream direction, with the downstream node instructing the upstream node which kind of signalling procedure is to be used.

The invention also relates to a first node for use in a network for setting up a connection from the first node to a second node through transmitting a request message from the first node to the second node and transmitting an allocation message from the second node to the first node.

The first node according to the invention is characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection.

The invention yet also relates to a second node for use in a network for setting up a connection from a first node to the second node through transmitting a request message from the first node to the second node and transmitting an allocation message from the second node to the first node.

The second node according to the invention is characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection.

The invention further relates to a method for setting up a connection from a first node to a second node, which method comprises the steps of transmitting a request message from the first node to the second node and of transmitting an allocation message from the second node to the first node.

The method according to the invention is characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection.

The invention yet further relates to a processor program product for setting up a connection from a first node to a second node, which processor program product comprises the functions of transmitting a request message from the first node to the second node and of transmitting an allocation message from the second node to the first node.

The processor program product according to the invention is characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection.

Embodiments of the first node according to the invention and of the second node according to the invention and of the method according to the invention and of the processor program product according to the invention correspond with the embodiments of the network according to the invention.

The invention is based upon an insight, inter alia, that two separate round trips for two separate signalling procedures make the network relatively inefficient, and is based upon a basic idea, inter alia, that the first node's capabilities with respect to a first signalling procedure and with respect to a second signalling procedure can be inserted into one and the same request message. In return, one allocation message is sufficient to instruct the first node to use one of the signalling procedures for the setting up of the connection.

The invention solves the problem, inter alia, to provide a network as defined in the preamble, which is relatively efficient, and is advantageous, inter alia, in that only one round trip is needed.

These and other aspects of the invention will be apparent from and elucidated with reference to the embodiments(s) described hereinafter.

DETAILED DESCRIPTION OF EXEPLARY EMBODIMENTS OF THE INVENTION

Figure 1:
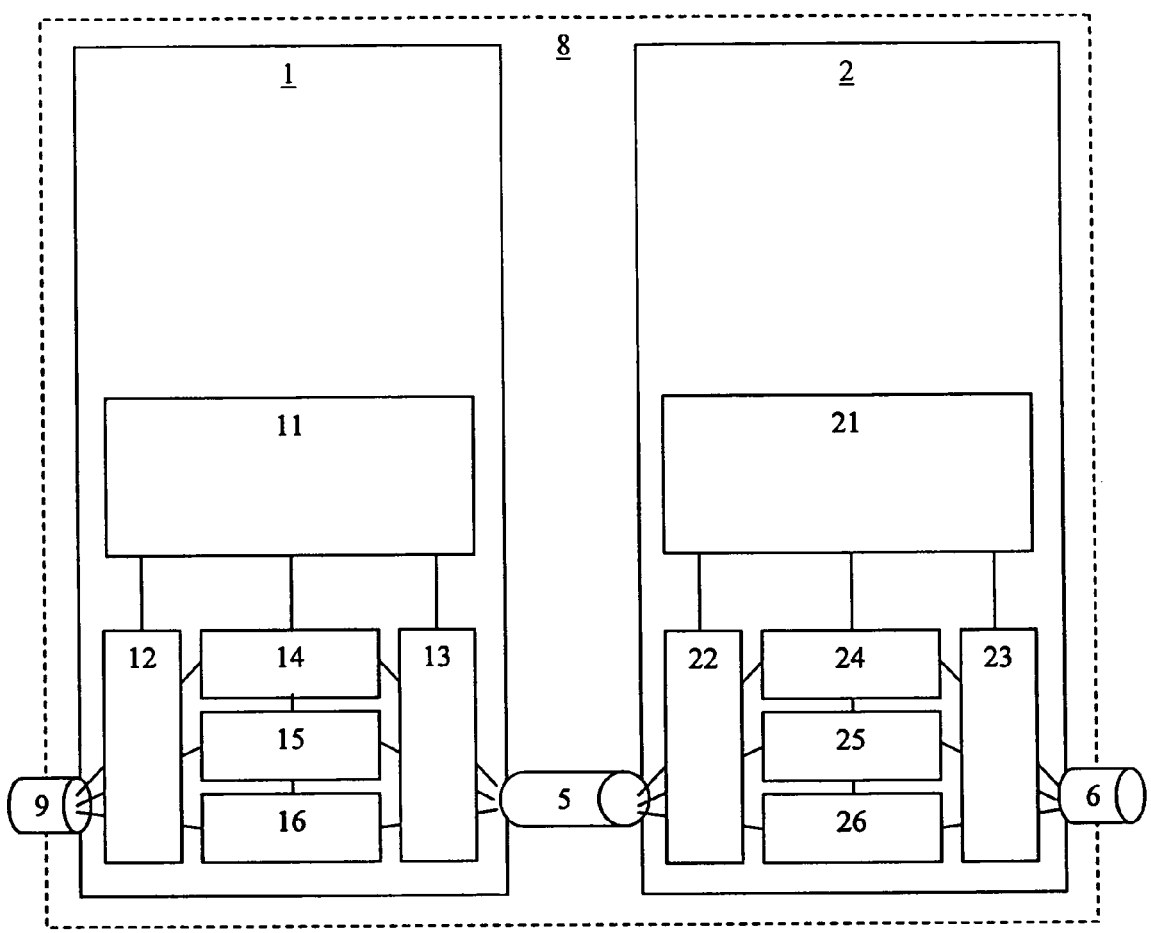
FIG. 1 shows diagrammatically a network according to the invention comprising nodes according to the invention.

The network 8 according to the invention as shown in FIG. 1 such as for example an optical fibre network comprises nodes 1,2 according to the invention such as for example optical switches. A first node 1 comprises a first interface 12 such as for example a first transceiver coupled to a fibre 9, and comprises a second interface 13 such as for example a second transceiver coupled to a fibre 5. Both interfaces 12,13 are coupled to each other via a parallel circuit of a wavelength switch 14, a waveband switch 15 and a fibre switch 16. All units 12-16 are coupled to a first controller 11. A second node 2 comprises a first interface 22 such as for example a first transceiver coupled to the fibre 5, and comprises a second interface 23 such as for example a second transceiver coupled to a fibre 6. Both interfaces 22,23 are coupled to each other via a parallel circuit of a wavelength switch 24, a waveband switch 25 and a fibre switch 26. All units 22-26 are coupled to a second controller 21.

The performance of the network 8 and its nodes 1,2 is explained at the hand of four examples as shown in FIG. 2-5.

Figure 2:
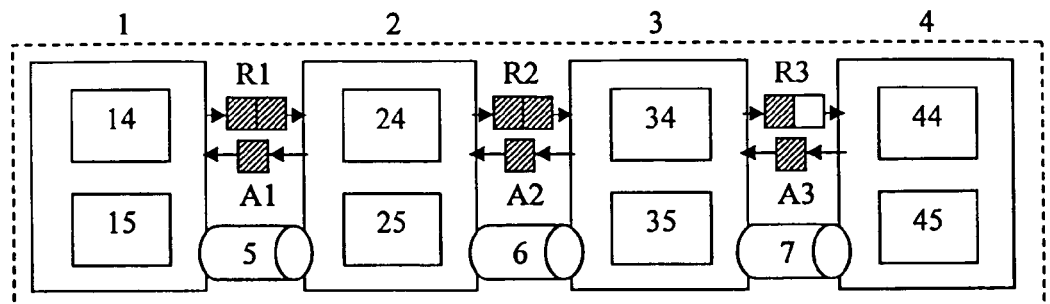
FIG. 2 shows diagrammatically a first example for setting up a connection between nodes according to the invention.
Figure 2:
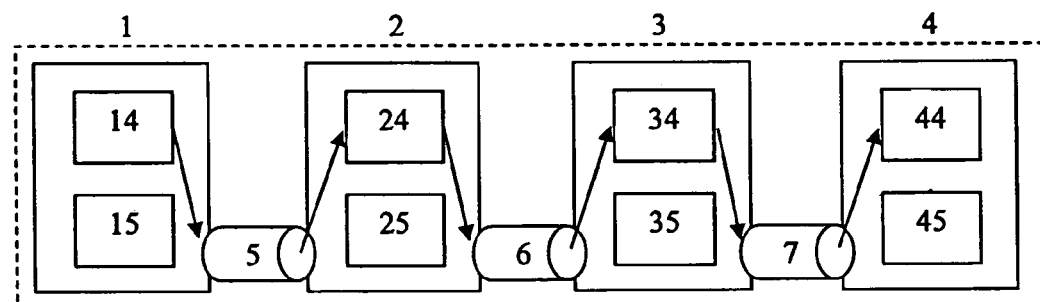

The first example for setting up a connection between nodes 1-4 according to the invention as shown in FIG. 2 discloses in its upper part and in its lower part four nodes 1-4. The node 1 comprises the wavelength switch 14 and the waveband switch 15, the node 2 comprises the wavelength switch 24 and the waveband switch 25, the node 3 comprises a wavelength switch 34 and a waveband switch 35, and the node 4 comprises a wavelength switch 44 and a waveband switch 45. Between the nodes 1 and 2, the fibre 5 is present, between the nodes 2 and 3, the fibre 6 is present, and between the nodes 3 and 4, a fibre 7 is present. FIG. 2 further discloses in its upper part some request and allocation messages. The node 1 sends a request message R1 to the node 2, which sends a request message R2 to the node 3, which sends a request message R3 to the node 4. The node 4 sends in return an allocation message A3 to the node 3, which sends an allocation message A2 to the node 2, which sends an allocation message A1 to the node 1. FIG. 2 further discloses in its lower part the connection as it is set up in response to the allocation messages A1-A3.

The node 1 has sent the request message R1 comprising an indication for indicating this node's capabilities with respect to a first signalling procedure (wavelength switching via the wavelength switch 14) and with respect to a second signalling procedure (waveband switching via the waveband switch 15). This indication comprises a first preference value P=1 indicated by the first non-empty block of R1 for the first signalling procedure and a second preference value Q=1 indicated by the second non-empty block of R1 for the second signalling procedure. So, the node 1 has indicated that both signalling procedures are possible.

The node 2 has sent the request message R2 comprising an indication for indicating this node's capabilities with respect to a first signalling procedure (wavelength switching via the wavelength switch 24) and with respect to a second signalling procedure (waveband switching via the waveband switch 25). This indication comprises a first preference value P=1 indicated by the first non-empty block of R2 for the first signalling procedure and a second preference value Q=1 indicated by the second non-empty block of R1 for the second signalling procedure. So, the node 2 has indicated that both signalling procedures are possible.

The node 3 has sent the request message R3 comprising an indication for indicating this node's capabilities with respect to a first signalling procedure (wavelength switching via the wavelength switch 34) and with respect to a second signalling procedure (waveband switching via the waveband switch 35). This indication comprises a first preference value P=1 indicated by the first non-empty block of R3 for the first signalling procedure and a second preference value Q=0 indicated by the second empty block of R3 for the second signalling procedure. So, the node 3 has indicated that the first signalling procedure is to be preferred.

The node 4 has sent back the allocation message A3 comprising an instruction for instructing the node 3 to use one of the signalling procedures for the setting up of the connection. This instruction comprises signalling information and a signalling procedure assignment. Because P=1 and Q=0, the node 4 has not had any option of selecting a signalling procedure, and as indicated by the non-empty block of A3, the node 4 has been forced to select the first signalling procedure to be used by the node 3. As a result, the wavelength switch 34 is used for switching the connection via the fibre 7.

The node 3 has sent back the allocation message A2 comprising an instruction for instructing the node 2 to use one of the signalling procedures for the setting up of the connection. This instruction comprises signalling information and a signalling procedure assignment. Because P=1 and Q=1, the node 3 has had the option of selecting a signalling procedure, and as indicated by the non-empty block of A2, the node 3 has selected the first signalling procedure to be used by the node 2. As a result, the wavelength switch 24 is used for switching the connection via the fibre 6.

The node 2 has sent back the allocation message A1 comprising an instruction for instructing the node 1 to use one of the signalling procedures for the setting up of the connection. This instruction comprises signalling information and a signalling procedure assignment. Because P=1 and Q=1, the node 2 has had the option of selecting a signalling procedure, and as indicated by the non-empty block of A1, the node 2 has selected the first signalling procedure to be used by the 15 node 1. As a result, the wavelength switch 14 is used for switching the connection via the fibre 5.

Figure 3:
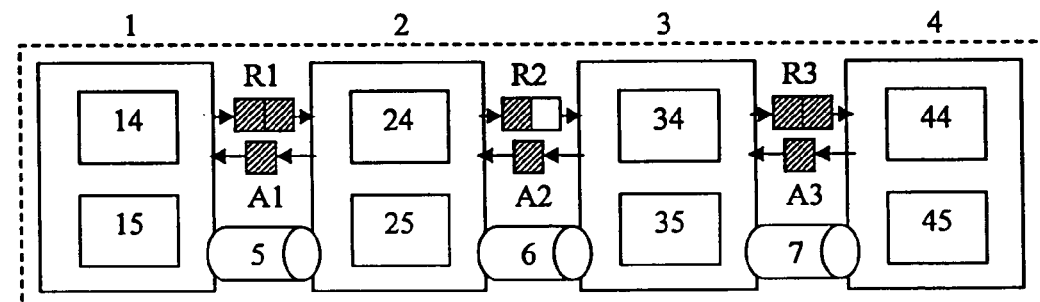
FIG. 3 shows diagrammatically a second example for setting up a connection between nodes according to the invention.
Figure 3:
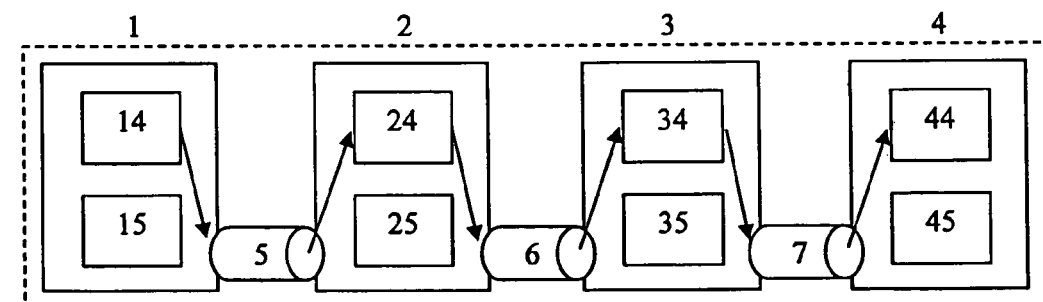

The second example for setting up a connection between nodes 1-4 according to the invention as shown in FIG. 3 discloses in its upper part and in its lower part four nodes 1-4 as already described above.

The node 1 has sent the request message R1 comprising an indication for indicating this node's capabilities with respect to a first signalling procedure (wavelength switching via the wavelength switch 14) and with respect to a second signalling procedure (waveband switching via the waveband switch 15). This indication comprises a first preference value P=1 indicated by the first non-empty block of R1 for the first signalling procedure and a second preference value Q=1 indicated by the second non-empty block of R1 for the second signalling procedure. So, the node 1 has indicated that both signalling procedures are possible.

The node 2 has sent the request message R2 comprising an indication for indicating this node's capabilities with respect to a first signalling procedure (wavelength switching via the wavelength switch 24) and with respect to a second signalling procedure (waveband switching via the waveband switch 25). This indication comprises a first preference value P=1 indicated by the first non-empty block of R2 for the first signalling procedure and a second preference value Q=0 indicated by the second empty block of R1 for the second signalling procedure. So, the node 2 has indicated that the first signalling procedure is to be preferred.

The node 3 has sent the request message R3 comprising an indication for indicating this node's capabilities with respect to a first signalling procedure (wavelength switching via the wavelength switch 34) and with respect to a second signalling procedure (waveband switching via the waveband switch 35). This indication comprises a first preference value P=1 indicated by the first non-empty block of R3 for the first signalling procedure and a second preference value Q=1 indicated by the second non-empty block of R3 for the second signalling procedure. So, the node 3 has indicated that both signalling procedures are possible.

The node 4 has sent back the allocation message A3 comprising an instruction for instructing the node 3 to use one of the signalling procedures for the setting up of the connection. This instruction comprises signalling information and a signalling procedure assignment. Because P=1 and Q=1, the node 4 has had the option of selecting a signalling procedure, and as indicated by the non-empty block of A3, the node 4 has selected the first signalling procedure to be used by the node 3. As a result, the wavelength switch 34 is used for switching the connection via the fibre 7.

The node 3 has sent back the allocation message A2 comprising an instruction for instructing the node 2 to use one of the signalling procedures for the setting up of the connection. This instruction comprises signalling information and a signalling procedure assignment. Because P=1 and Q=0, the node 3 has not had any option of selecting a signalling procedure, and as indicated by the non-empty block of A2, the node 3 has been forced to select the first signalling procedure to be used by the node 2. As a result, the wavelength switch 24 is used for switching the connection via the fibre 6.

The node 2 has sent back the allocation message A1 comprising an instruction for instructing the node 1 to use one of the signalling procedures for the setting up of the connection. This instruction comprises signalling information and a signalling procedure assignment. Because P=1 and Q=1, the node 2 has had the option of selecting a signalling procedure, and as indicated by the non-empty block of A1, the node 2 has selected the first signalling procedure to be used by the node 1. As a result, the wavelength switch 14 is used for switching the connection via the fibre 5.

Figure 4:
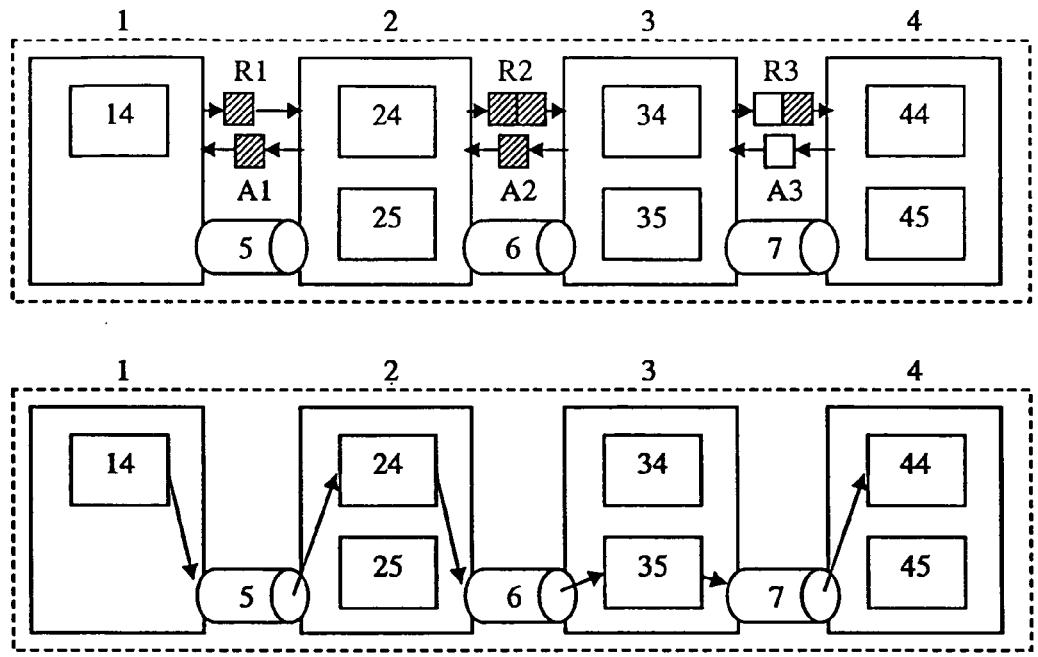
FIG. 4 shows diagrammatically a third example for setting up a connection between nodes according to the invention.
Figure 5:
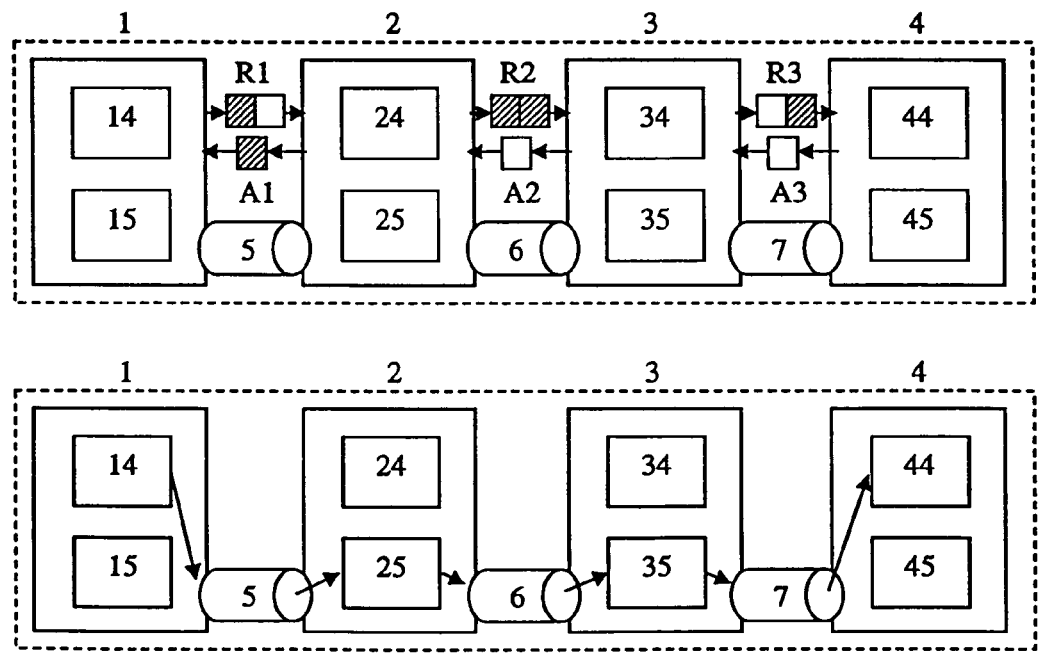
FIG. 5 shows diagrammatically a fourth example for setting up a connection between nodes according to the invention.

The third example for setting up a connection between nodes 1-4 according to the invention as shown in FIG. 4 discloses in its upper part and in its lower part four nodes 1-4 as already described above, apart from the fact that the node 1 does not comprise the waveband switch 15. Alternatively, this waveband switch 14 is out of order.

The node 1 has sent the request message R1 comprising an indication for indicating this node's capabilities with respect to a first signalling procedure (wavelength switching via the wavelength switch 14) and with respect to a second signalling procedure (waveband switching via the waveband switch 15). This indication comprises a first preference value P=1 indicated by the first non-empty block of R1 for the first signalling procedure and does not comprise a second preference value Q. So, the node 1 has indicated that only the first signalling procedure is possible.

The node 2 has sent the request message R2 comprising an indication for indicating this node's capabilities with respect to a first signalling procedure (wavelength switching via the wavelength switch 24) and with respect to a second signalling procedure (waveband switching via the waveband switch 25). This indication comprises a first preference value P=1 indicated by the first non-empty block of R2 for the first signalling procedure and a second preference value Q=1 indicated by the second non-empty block of R1 for the second signalling procedure. So, the node 2 has indicated that both signalling procedures are possible.

The node 3 has sent the request message R3 comprising an indication for indicating this node's capabilities with respect to a first signalling procedure (wavelength switching via the wavelength switch 34) and with respect to a second signalling procedure (waveband switching via the waveband switch 35). This indication comprises a first preference value P=0 indicated by the first non-empty block of R3 for the first signalling procedure and a second preference value Q=1 indicated by the second non-empty block of R3 for the second signalling procedure. So, the node 3 has indicated that the second signalling procedure is to be preferred.

The node 4 has sent back the allocation message A3 comprising an instruction for instructing the node 3 to use one of the signalling procedures for the setting up of the connection. This instruction comprises signalling information and a signalling procedure assignment. Because P=0 and Q=1, the node 4 has not had any option of selecting a signalling procedure, and as indicated by the empty block of A3, the node 4 has selected the second signalling procedure to be used by the node 3. As a result, the waveband switch 35 is used for switching the connection via the fibre 7.

The node 3 has sent back the allocation message A2 comprising an instruction for instructing the node 2 to use one of the signalling procedures for the setting up of the connection. This instruction comprises signalling information and a signalling procedure assignment. Because P=1 and Q=1, the node 3 has had the option of selecting a signalling procedure, and as indicated by the non-empty block of A2, the node 3 has selected the first signalling procedure to be used by the node 2. As a result, the wavelength switch 24 is used for switching the connection via the fibre 6.

The node 2 has sent back the allocation message A1 comprising an instruction for instructing the node 1 to use one of the signalling procedures for the setting up of the connection. This instruction comprises signalling information and a signalling procedure assignment. Because P=1 and Q is not given, the node 2 has not had any option of selecting a signalling procedure, and as indicated by the non-empty block of A1, the node 2 has selected the first signalling procedure to be used by the node 1. As a result, the wavelength switch 14 is used for switching the connection via the fibre 5.

The fourth example for setting up a connection between nodes 1-4 according to the invention as shown in FIG. 4 discloses in its upper part and in its lower part four nodes 1-4 as already described above.

The node 1 has sent the request message R1 comprising an indication for indicating this node's capabilities with respect to a first signalling procedure (wavelength switching via the wavelength switch 14) and with respect to a second signalling procedure (waveband switching via the waveband switch 15). This indication comprises a first preference value P=1 indicated by the first non-empty block of R1 for the first signalling procedure and a second preference value Q=0 indicated by the second empty block of R1 for the second signalling procedure. So, the node 1 has indicated that the first signalling procedure is to be preferred.

The node 2 has sent the request message R2 comprising an indication for indicating this node's capabilities with respect to a first signalling procedure (wavelength switching via the wavelength switch 24) and with respect to a second signalling procedure (waveband switching via the waveband switch 25). This indication comprises a first preference value P=1 indicated by the first non-empty block of R2 for the first signalling procedure and a second preference value Q=1 indicated by the second empty block of R1 for the second signalling procedure. So, the node 2 has indicated that both signalling procedures are possible.

The node 3 has sent the request message R3 comprising an indication for indicating this node's capabilities with respect to a first signalling procedure (wavelength switching via the wavelength switch 34) and with respect to a second signalling procedure (waveband switching via the waveband switch 35). This indication comprises a first preference value P=0 indicated by the first empty block of R3 for the first signalling procedure and a second preference value Q=1 indicated by the second non-empty block of R3 for the second signalling procedure. So, the node 3 has indicated that the second signalling procedure is to be preferred.

The node 4 has sent back the allocation message A3 comprising an instruction for instructing the node 3 to use one of the signalling procedures for the setting up of the connection. This instruction comprises signalling information and a signalling procedure assignment. Because P=0 and Q=1, the node 4 has not had any option of selecting a signalling procedure, and as indicated by the empty block of A3, the node 4 has selected the second signalling procedure to be used by the node 3. As a result, the waveband switch 35 is used for switching the connection via the fibre 7.

The node 3 has sent back the allocation message A2 comprising an instruction for instructing the node 2 to use one of the signalling procedures for the setting up of the connection. This instruction comprises signalling information and a signalling procedure assignment. Because P=1 and Q=1, the node 3 has had the option of selecting a signalling procedure, and as indicated by the empty block of A2, the node 3 has selected the second signalling procedure to be used by the node 2. As a result, the waveband switch 25 is used for switching the connection via the fibre 6.

The node 2 has sent back the allocation message A1 comprising an instruction for instructing the node 1 to use one of the signalling procedures for the setting up of the connection. This instruction comprises signalling information and a signalling procedure assignment. Because P=1 and Q=0, the node 2 has not had any option of selecting a signalling procedure, and as indicated by the non-empty block of A1, the node 2 has been forced to select the first signalling procedure to be used by the node 1. As a result, the wavelength switch 14 is used for switching the connection via the fibre 5.

To be able to introduce the indication for indicating the node's capabilities with respect to a first signalling procedure and with respect to a second signalling procedure and possibly with respect to a third signalling procedure etc., the request messages R1-R3 need to get an additional field or a label. The insertion of the indication can be done via one of the interfaces 12,13,22,23 or via one of the switches 14,15, 16,24,25,26. The controllers 11,21 supply the indication comprising a first preference value for the first signalling procedure and a second preference value for the second signalling procedure and possibly a third preference value for the third signalling procedure etc. To be able to introduce the instruction for instructing the node to use one of the signalling procedures for the setting up of the connection, either an existing field or label is used, or the allocation messages A1-A3 need to get an additional field or label. The insertion of the instruction can be done via one of the interfaces 12,13, 22,23 or via one of the switches 14,15,16,24,25,26. The controllers 11,21 supply the instruction comprising signalling information and a signalling procedure assignment.

The controllers 11,21 are arranged to run a label assignment algorithm for making the signalling procedure assignment in dependence of the preference values and are arranged to derive further signalling information from the signalling information, which signalling information is related to the first signalling procedure and which further signalling information is related to the second signalling procedure, and are possibly arranged to derive yet further signalling information from the (further) signalling information, which (further) signalling information is related to the first (second) signalling procedure and which yet further signalling information is related to the third signalling procedure etc. The label assignment algorithm generates the signalling procedure assignment for assigning one of the signalling procedures to the node receiving the allocation message. The signalling information can be related to the first signalling procedure, as long as this node is capable of deriving the (yet) further signalling information from this (further) signalling information. Then, the node sending the allocation message does not need to adapt this signalling information, but can send the signalling information to the node receiving the allocation message independently from the kind of signalling procedure to be used. To be able to derive the (yet) further signalling information from the (further) signalling information, for example table memories are used.

The first signalling procedure is for example wavelength switching, and the second signalling procedure is for example waveband switching. The signalling information then comprises the wavelength to be used. In case of the waveband needing to be switched (possibly preferably), this waveband can be derived from the wavelength information. Alternatively and/or in addition, the first signalling procedure is for example waveband switching, and the second signalling procedure is for example fibre switching. The signalling information then comprises the waveband to be used. In case of the fibre needing to be switched (possibly preferably), the fibre to be used can be derived from the waveband information. Other kinds of switching procedures are not to be excluded.

The node 1 is for example located at an upstream location, and the node 4 is for example located at a downstream location. The connection is then set up in a downstream direction, with the downstream node instructing the upstream node which kind of signalling procedure is to be used. The request messages go downstream, the allocation messages go upstream.

An example of the label assignment algorithm is as follows:

| Label Assignment Algorithm |
|---|
| If SC_P[i+1] = 1 and SC_Q[i+1] = 0<br>   then Label_P[i]<br>   i <- i - 1<br>If SC_P[i+1] = 0 and SC_Q[i+1] = 1<br>   then Label_Q[i] <- Label_P[i]<br>   i <- i - 1<br>If SC_P[i+1] = 1 and SC_Q[i+1] = 1<br>   if P[I]=1 and Q[I]=X<br>      then Label_P[I], SC_P[i]=1, SC_Q[i]=0<br>      i <- i - 1<br>   if P[i]=0 and Q[i]=1<br>      then Label_Q[i] <- Label_P[i], SC_P[i]=0, SC_Q[i]=1<br>      i <- i - 1<br>   if P[i]=1 and Q[i]=0<br>      then Label_Q[i] <- Label_P[i], SC_P[i]=1, SC_Q[i]=0<br>      i <- i - 1<br>   if P[i]=1 and Q[i]=1<br>      then Label_Q[i] <- Label_P[i], SC_P[i]=1, SC_Q[i]=1<br>      i <- i - 1<br>If SC_P[i+1] = 0 and SC_Q[i+1] = 0, then STOP |

Legend:
SC = Switching Capability – P,
Q = Preference bit,
I = node Index

The expression "for" in for example "for setting up", "for indicating" and "for instructing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The steps/functions of transmitting etc. do not exclude further steps, like for example, inter alia, the steps/functions as described for FIG. 1-5 etc.

The invention claimed is:

1. A network comprising a first node and a second node for setting up a connection from the first node to the second node, the network comprising:

the first node transmitting a request message from the first node to the second node, the second node transmitting an allocation message from the second node to the first node, wherein the request message comprises an indication for indicating the first node's capabilities with respect to a first signalling procedure and with respect to a second signalling procedure, and the allocation message comprises an instruction for instructing the first node to use one of the signalling procedures for the setting up of the connection, and wherein the indication comprises a bit having a value of 0 when the first node cannot handle the first signaling procedure or the second signaling procedure, and the indication comprises a bit value of 1 when the first node can handle the first signaling procedure or the second signaling procedure;

wherein the first signaling procedure and the second signaling procedure are different from each other, and wherein the first signaling procedure and the second signaling procedure is at least one of a wavelength switching, a waveband switching, and a fibre switching.

2. The network as defined in claim 1, characterised in that the first node comprises a first controller for supplying the indication comprising a first preference value for the first signalling procedure and a second preference value for the second signalling procedure, the second node comprising a second controller for supplying the instruction comprising signalling information and a signalling procedure assignment.

3. The network as defined in claim 2, characterised in that the second controller is arranged to run a label assignment algorithm for making the signalling procedure assignment in dependence of the preference values, the first controller being arranged to derive further signalling information from the signalling information, which signalling information is related to the first signalling procedure and which further signalling information is related to the second signalling procedure.

4. The network as defined in claim 3, characterised in that the first signalling procedure is wavelength switching, the second signalling procedure being waveband switching.

5. The network as defined in claim 3, characterised in that the first signalling procedure is waveband switching, the second signalling procedure being fibre switching.

6. The network as defined in claim 1, characterised in that the first node is an upstream node, the second node being a downstream node.

7. A method for setting up a connection between a first node and a second node in a network, the method comprising:

transmitting a request message from the first node to the second node and transmitting an allocation message from the second node to the first node, wherein the request message comprises an indication for indicating the first node's capabilities with respect to a first signalling procedure and with respect to a second signalling procedure, the allocation message comprising an instruction for instructing the first node to use one of the signalling procedures for the setting up of the connection, and wherein the indication comprises a bit having a value of 0 when the first node cannot handle the first signaling procedure or the second signaling procedure, and the indication comprises a bit value of 1 when the first node can handle the first signaling procedure or the second signaling procedure;

wherein the first signaling procedure and the second signaling procedure are different from each other, and wherein the first signaling procedure and the second signaling procedure is at least one of a wavelength switching, a waveband switching, and a fibre switching.

8. A method for setting up a connection from a first node to a second node, wherein the method comprises the steps of transmitting a request message from the first node to the second node and of transmitting an allocation message from the second node to the first node, characterised in that the request message comprises an indication for indicating the first node's capabilities with respect to a first signalling procedure and with respect to a second signalling procedure, the allocation message comprising an instruction for instructing the first node to use one of the signalling procedures for the setting up of the connection, and wherein the indication comprises a bit having a value of 0 when the first node cannot handle the first signaling procedure or the second signaling procedure, and the indication comprises a bit value of 1 when the first node can handle the first signaling procedure or the second signaling procedure;

wherein the first signaling procedure and the second signaling procedure are different from each other, and wherein the first signaling procedure and the second signaling procedure is at least one of a wavelength switching, a waveband switching, and a fibre switching.

* * * * *